United States Patent
Le Tourneur

(10) Patent No.: US 8,642,969 B2
(45) Date of Patent: Feb. 4, 2014

(54) SEALED TUBE NEUTRON GENERATOR EQUIPPED WITH ALPHA PARTICLE DETECTORS AND ASSOCIATED PARTICLE MEASUREMENT SYSTEM WHICH USES THE GENERATOR

(75) Inventor: Philippe Le Tourneur, Ozoir la Ferriere (FR)

(73) Assignee: Societe Anonyme d'Etudes et Realisations Nucleaires, Limeil-Brevannes (FR)

( * ) Notice: Subject to any disclaimer, the term of this patent is extended or adjusted under 35 U.S.C. 154(b) by 370 days.

(21) Appl. No.: 12/773,416

(22) Filed: May 4, 2010

(65) Prior Publication Data

US 2010/0282976 A1 Nov. 11, 2010

Related U.S. Application Data

(60) Provisional application No. 61/289,839, filed on Dec. 23, 2009.

(30) Foreign Application Priority Data

May 6, 2009 (FR) ...................................... 09 53016

(51) Int. Cl.
*G01T 1/178* (2006.01)
*G01T 1/24* (2006.01)

(52) U.S. Cl.
USPC .................................................... 250/370.02

(58) Field of Classification Search
USPC ............. 250/370.02, 370.05, 390.01, 390.11, 250/269.6, 269.7
See application file for complete search history.

(56) References Cited

U.S. PATENT DOCUMENTS

| | | | |
|---|---|---|---|
| 6,297,507 B1 * | 10/2001 | Chen et al. | 250/370.11 |
| 2005/0195931 A1 | 9/2005 | Maglich | |
| 2007/0241283 A1 | 10/2007 | Chu et al. | |
| 2011/0062319 A1 * | 3/2011 | Nikitin et al. | 250/254 |

FOREIGN PATENT DOCUMENTS

| | | |
|---|---|---|
| FR | 2 738 669 | 3/1997 |
| WO | WO 2004/029601 A1 | 4/2004 |
| WO | WO 2004/064462 A1 | 7/2004 |

OTHER PUBLICATIONS

U.S. Appl. No. 12/772,509, filed May 3, 2010, Le Tourneur.
U.S. Appl. No. 12/774,952, filed May 6, 2010, Groiselle, et al.
E. Rhodes, et al., "APSTNG: Neutron Interrogation for Detection of Drugs and Other Contraband", Contraband and Cargo Inspection Technology International Symposium, Oct. 28-30, 1992, 9 pages.

(Continued)

*Primary Examiner* — Casey Bryant
(74) *Attorney, Agent, or Firm* — Oblon, Spivak, McClelland, Maier & Neustadt, L.L.P.

(57) ABSTRACT

This generator is equipped with a first alpha particle detector (32) for monitoring the neutrons which are emitted within a first solid angle. According to the invention it is in addition equipped with at least one second alpha particle detector (52) for monitoring the neutrons which are emitted within a second solid angle which is different from the first solid angle. The system allows an object (2) that is placed in the first solid angle to be analysed by means of one or more gamma radiation detectors (34) that are placed in the second solid angle.

7 Claims, 3 Drawing Sheets

(56) References Cited

OTHER PUBLICATIONS

Ed Rhodes, et al., "Advances in Associated-Particle Sealed-Tube Neutron Probe Diagnostics for Substance Detection", Neutron Techniques of Conference on Substance Identification, Analysis, and Technologies for Law Enforcement of European Symposium on Optics for Environmental and Public Safety, Jun. 19-23, 1995, 13 pages.

L. E. Ussery, et al., "Design and Development of the Associated-Particle Three-Dimensional Imaging Technique", LA-12847-MS, UC-706 and UC-700, Oct. 1994, 20 pages.

J.D. Wood, "A Sealed-Off 14 McV Neutron Source Incorporating a Solid State Alpha-Particle Detector", Nuclear Instruments and Methods 21, 1963, pp. 49-52.

* cited by examiner

SEALED TUBE NEUTRON GENERATOR EQUIPPED WITH ALPHA PARTICLE DETECTORS AND ASSOCIATED PARTICLE MEASUREMENT SYSTEM WHICH USES THE GENERATOR

TECHNICAL FIELD

The present invention relates to analysis of material by neutron interrogation, by the associated particle technique.

More specifically the invention relates to a sealed tube neutron generator, more simply called the "sealed neutron tube", as well as an associated particle measurement system which uses the generator.

It applies in particular to the determination of the location and chemical composition of hidden materials such as drugs or explosives.

STATE OF THE PRIOR ART

Concerning the associated particle technique, sealed tube neutron generators equipped with an alpha particle detector and associated particle measurement systems, reference will be made to the following documents:

[1] E. Rhodes and C. W. Peters, "APSTNG: neutron interrogation for detection of drugs and other contraband", Contraband and cargo inspection technology international symposium, 28-30 Oct. 1992, Washington, D.C., USA.

[2] E. Rhodes, C. E. Dickerman and M. Frey, "Advances in associated-particle neutron probe diagnostics for substance detection", Neutron techniques of conference on substance identification, analysis, and technologies for law enforcement of European symposium on optics for environmental and public safety", 19-23 Jun. 1995, Munich, Germany.

[3] L. E. Ussery and C. L. Hollas, "Design and development of the associated-particle three-dimensional imaging technique", LA-12847-MS, UC-706 and UC-700, October 1994.

[4] J. D. Wood, "A sealed-off 14 MeV neutron source incorporating a solid state alpha-particle detector", Nuclear Instruments and Methods 21 (1963), pp. 49-52.

[5] WO 2004/064462, Coded target for neutron source, Invention by Philippe Le Tourneur.

[6] FR 2 738 669, Tube générateur de neutrons équipé d'un détecteur de particules alpha, invention by Yves Serge Cluzeau.

[7] U.S. Pat. No. 6,297,507, Sealed tube neutron generator incorporating an internal associated-ALP, invention by Z. Chen et al.

Known sealed tube neutron generators, equipped with a single alpha particle detector, pose problems, which will be returned to later, during their use in implementing the associated particle technique.

In effect, known associated particle measurement systems include one or more gamma radiation detectors as well as shielding which protects these latter from neutrons emitted by the generator. Some of the neutrons which are sent towards the detectors, however, interact with this shielding (or directly in the detector, after passing through the shielding—please see below) and create undesirable events which contribute to the noise affecting the measurements.

PRESENTATION OF THE INVENTION

The purpose of the present invention is to reduce this noise, which enable the performance of associated particle measurement systems to be improved.

In precise terms, the subject of the present invention is a sealed tube neutron generator, equipped with a first alpha particle detector, for monitoring the neutrons which are emitted in a first solid angle, with this generator being characterised in that it is in addition equipped with at least one second alpha particle detector, for monitoring the neutrons that are emitted in a second solid angle which is different from the first solid angle.

According to one specific embodiment of the generator which is the subject of the invention, the first and second alpha particle detectors are adjacent.

The first and second alpha particle detectors may respectively form the first and second portions of a single alpha particle detector, with the second portion thus enabling the solid angle which is associated with the first portion to be extended.

The first and second alpha particle detectors may be made of materials selected from amongst the semiconductors and the scintillators.

For example, the first and second alpha particle detectors may be made of materials selected from amongst YAP, ZnO, LSO, ZnS and $LaBr_3$.

The present invention also relates to an associated particle measurement system for analysing an object from gamma radiation induced by neutrons which interact with the object, where the system includes:

the sealed tube neutron generator which is the subject of the invention, at least one gamma radiation detector, a data acquisition system which is supplied by the first and second alpha particle detectors with which the generator is equipped and by the gamma radiation detector, and a system for processing the data thus acquired.

wherein the first alpha particle detector is intended to detect alpha particles associated with the neutrons which interact with the object, and the second alpha particle detector is intended to detect alpha particles associated with neutrons which may be sent towards the gamma radiation detector, in order to protect the latter in a non-material manner against neutrons and therefore reduce the noise affecting the measurements.

According to one specific embodiment of the invention, the system lacks protective shielding against neutrons between the sealed tube neutron generator and the gamma radiation detector.

BRIEF DESCRIPTION OF DRAWINGS

The present invention will be better understood by reading the description of embodiment examples given hereafter, which are purely for indication purposes only and which are in no way restrictive, whilst referring to the appended drawings wherein.

DETAILED PRESENTATION OF SPECIFIC EMBODIMENTS

The associated particle technique is implemented through the use of a sealed neutron tube which uses the deuterium-tritium fusion reaction to produce neutrons and which is equipped with an alpha particle detector which makes it possible to monitor the neutrons emitted in a certain solid angle. The signal-to-noise ratio for the measurement is improved by means of an event coincidence technique and a spatial component is added to the information obtained.

In accordance with the present invention, a second alpha particle detector is added, or the solid angle covered by the first is extended, so as to include within this solid angle the gamma detector or detectors of an associated particle measurement system.

This additional alpha particle detector therefore makes it possible to know when a neutron has been sent to the gamma radiation detector, more simply called the "gamma detector", where this detector is normally responsible for detecting the gamma radiation coming only from the object which is analysed by means of the system. Consequently, it will be possible to reject an event possibly detected at this moment by the gamma detector since it will be identified as being noise.

The system therefore ensures that the neutron sent to the gamma detector does not induce noise in detection: it therefore acts as a sort of electronic shielding.

Figure 1:
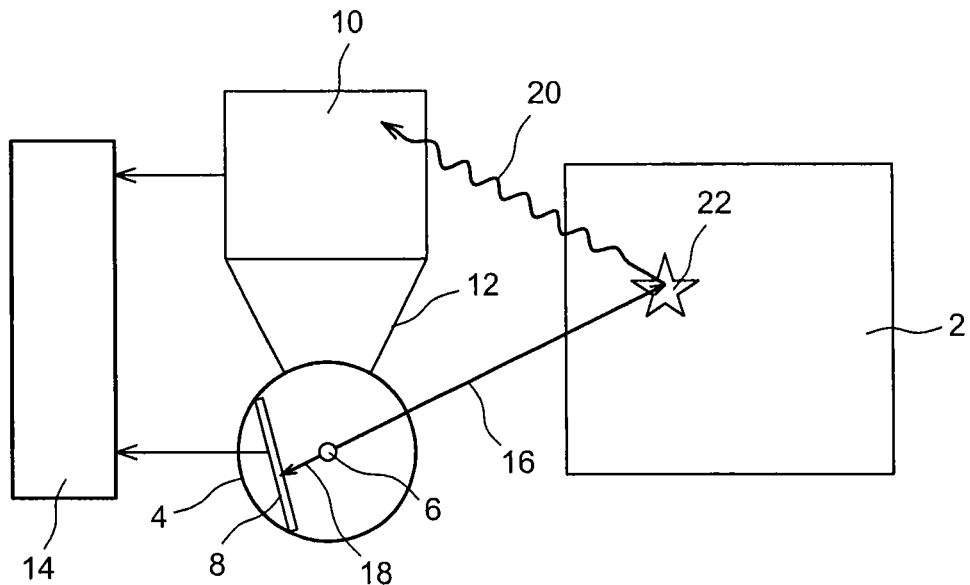
FIG. 1 is a schematic view of a known associated particle measurement system.

The principle of associated particle neutron interrogation is schematically illustrated in FIG. 1.

It shows a known associated particle measurement system for analysing an object 2. This system includes a sealed neutron tube 4, which includes a target 6 and which is equipped with an alpha particle detector 8, more simply called the "alpha detector".

The system also includes a gamma detector 10, a shielding 12 which protects the gamma detector from the emission from the neutron tube 4, and an assembly 14 of systems for acquiring the data supplied by the detectors 8 and 10 and for processing the acquired data.

The target 6 of the tube 4 is the location of the nuclear reaction D+T→α+n (D: deuterium; T: tritium; α: alpha particle; n: neutron). Thus there is an alpha particle which follows a trajectory 18 at 180° to the trajectory 16 followed by a neutron emitted towards the object 2.

The detection by the detector 8 of the alpha particle associated with the neutron allows the trajectory 16 of the neutron to be known.

If a gamma photon 20 from the interaction of this neutron and an unknown atom 22 of the object is detected, the energy of the gamma photon makes it possible to identify the nature of the atom. Furthermore, the time difference between the detection of the alpha particle and the detection of the gamma photon, and the knowledge of the respective speeds of the alpha particle, of the neutron and of the gamma photon also make it possible to identify where the atom 22 is located within the object 2.

At the end of data acquisition and data processing, the object is known through the nature of its atoms and the location of the latter.

Figure 2:
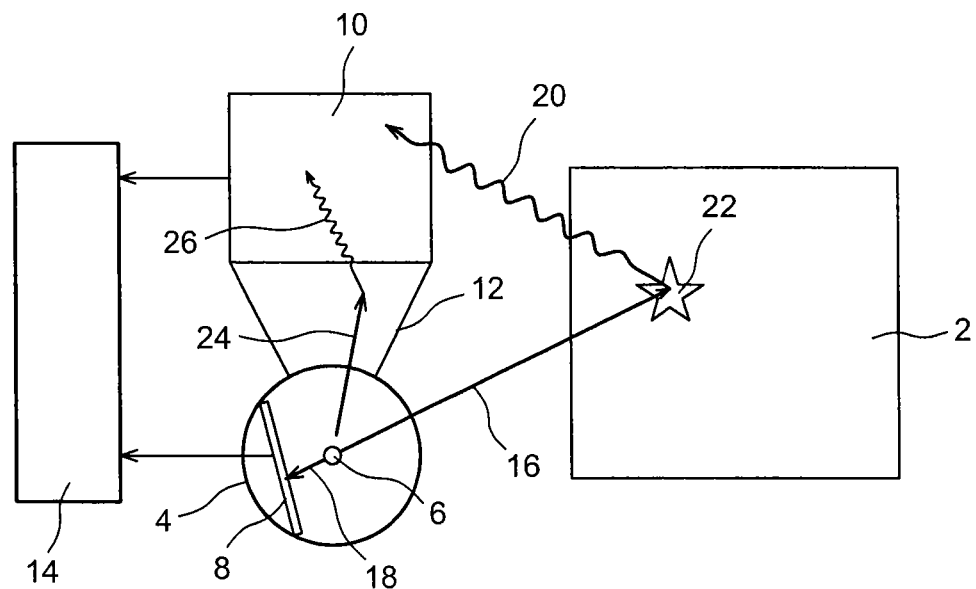
FIG. 2 schematically shows the drawbacks exhibited by this known system.

FIG. 2 schematically illustrates what may occur with the system in FIG. 1.

This system operates well if the flow of events in the gamma detector 10 is not too great, so that a photon of interest is not confused with any other interaction within the detector. In particular the gamma detector 10 must therefore be protected from the emission from the neutron tube 4 (which emits neutrons in a solid angle of 4Π steradians) by an effective shielding 12, which is difficult to achieve with neutrons.

By way of an example, the trajectory 24 of an undesirable neutron can be seen, coming from the target 6. This undesirable neutron interacts with the shielding 12 and generates an undesirable gamma photon 26 which is also detected by the detector 10. Thus, there is a risk of confusing the photon of interest 20 with the undesirable photon 26.

It should be noted that another source of noise is the direct interaction of the neutron in the detector 10 (in particular via the creation of a gamma photon, directly in the material of the detector or not), after this neutron has passed through the shielding.

Figure 3:
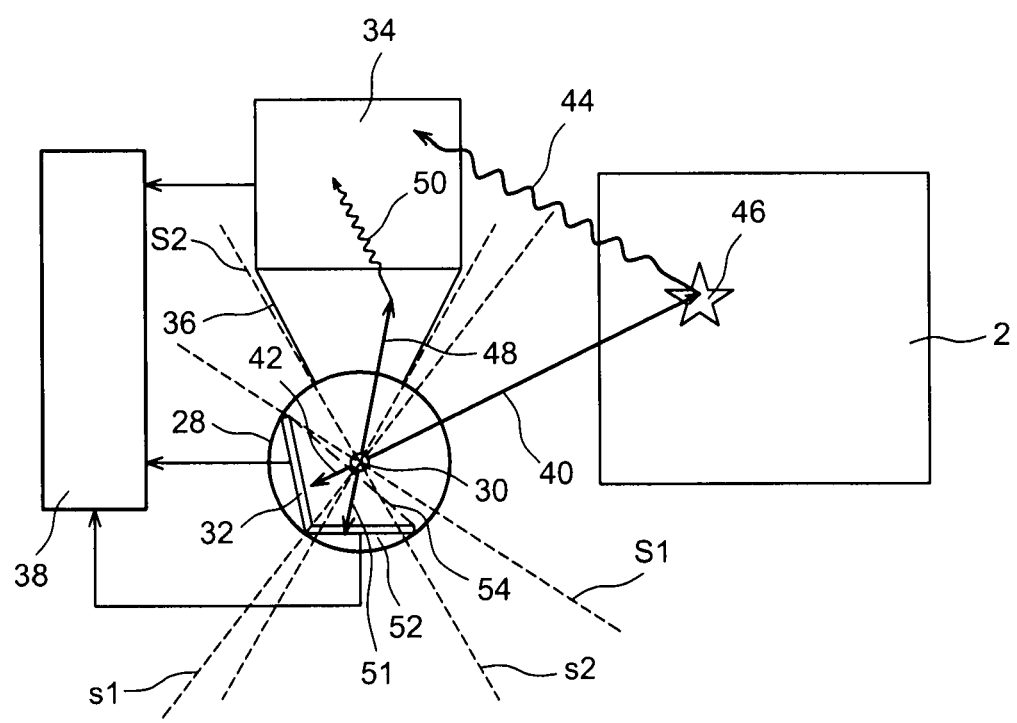
FIG. 3 is a schematic view of a specific embodiment of the associated particle measurement system which is the subject of the invention.

FIG. 3 is a schematic view of a specific embodiment of the associated particle measurement system which is the subject of the invention.

The system shown in FIG. 3 is once more intended for the analysis of the object 2 and includes, as before: a sealed neutron tube 28, which includes a target 30 and which is equipped with an alpha detector 32, the object 2 being placed in the solid angle defined by the alpha detector 32 and the target 30; a gamma detector 34 equipped with a shielding 36; and an assembly 38 of acquisition and processing systems.

Once more there are shown: the trajectory 40 of a neutron from the target; the trajectory 42 of the associated alpha particle; the gamma photon 44 which results from the interaction of the neutron with an unknown atom 46 of the object 2; and the trajectory 48 of an undesirable neutron which is sent towards the detector 34, interacts with the shielding 36 (or directly in the detector, after passing through the shielding—see above) and thus generates an undesirable photon 50 detected by the detector 34.

The trajectory of the alpha particle associated with the undesirable neutron has reference 51 on FIG. 3. In accordance with the invention, a second alpha detector 52 is placed within the neutron tube 28, and this receives this alpha particle and will inform the assembly 38 that the undesirable neutron 48 has been sent towards the detector 34. Any event that is synchronous (taking the propagation time into account) with this sending is not taken into consideration by the measurement system. Thus the alpha particle associated with the undesirable neutron is detected and the corresponding gamma event is not taken into consideration.

In the event of 100% of alpha particles associated with undesirable neutrons being detected (in fact more than 90% of these can generally be detected), it is as if the shielding 36 were infinitely opaque.

Consequently the invention enables:
material shielding to be reduced or
the gamma detector to be brought closer to the neutron tube or
the emission of neutrons by the tube to be increased or
with all other things being equal, significantly improved overall performance to be achieved for the measurement system, by reducing the noise affecting the measurements.

The advantage of the neutron tube which is in accordance with the invention is therefore that it increases overall final performance of such a system by reducing the noise in the gamma detectors. This advantage may also take the form of the removal of any material shielding between the neutron tube and the gamma detectors.

This is of particular interest in the case of small systems where the detectors are necessarily close to the neutron source. This removal of the shielding, which is usually made of a heavy material such as lead, is expressed as a reduction in weight.

The implementation of this electronic shielding (or non-material shielding, as opposed to material shielding) first of all involves putting the additional alpha detector 52 in place in the neutron tube 28. This alpha detector 52 must be placed so that the system gamma detector(s) 34 are in the solid angle opposite the solid angle defined by the alpha detector 52 and the target of the neutron tube 28.

More specifically, the gamma detector(s) 34 is (are) in the solid angle defined by a nappe S2 of a cone whose apex is the centre of the target 30 and whose other nappe s2 substantially rests on the alpha detector 52; and the latter enables monitoring of neutrons emitted in the solid angle defined by the nappe S2 to be carried out, by detecting the associated alpha particles emitted in the solid angle defined by the nappe s2 opposite the nappe S2.

And the object 2 is in the solid angle defined by the nappe S1 of a cone whose apex is the centre of the target 30 and whose other nappe s1 substantially rests on the alpha detector 32; and the latter enables monitoring of neutrons emitted in the solid angle defined by the nappe S1 to be carried out, by detecting the associated alpha particles emitted in the solid angle defined by the nappe s1 opposite the nappe S1.

The nappes S1 and S2 are distinct from each other, similarly for the corresponding solid angles. Similarly the nappes s1 and s2 are distinct from each other, similarly for the corresponding solid angles.

In the example in FIG. 3, the detectors 32 and 52 are adjacent and substantially in contact with each other, as may be seen.

They may also be replaced by a single alpha detector, for example of the type that is shown in broken lines 54 in FIG. 3. In that case the two alpha detectors form two portions of this single detector (on which the nappes s1 and s2 once again respectively lie).

The manufacture of alpha detectors 32 and 52 and of the neutron tube 28 involves known and well-controlled technologies.

The alpha detectors 32 and 52 must be in such a position that the alpha particles emitted by the target 30 during the reaction producing the neutrons (D+T→α+n) can reach them. Therefore they must be facing the target 30 and there must be no obstructions between them and the target 30.

These detectors may be made either from semiconductor materials or from scintillator materials such as, for example, YAP (yttrium aluminium perovskite), ZnO, LSO (lutetium orthosilicate), ZnS, or $LaBr_3$, or from any other principle for alpha detection (for example diamond deposition or use of micro-channel plates).

The implementation of electronic shielding also implies that the information processing system is designed so that it is able to handle temporally coincident events produced from gamma and alpha detectors.

Figure 4:
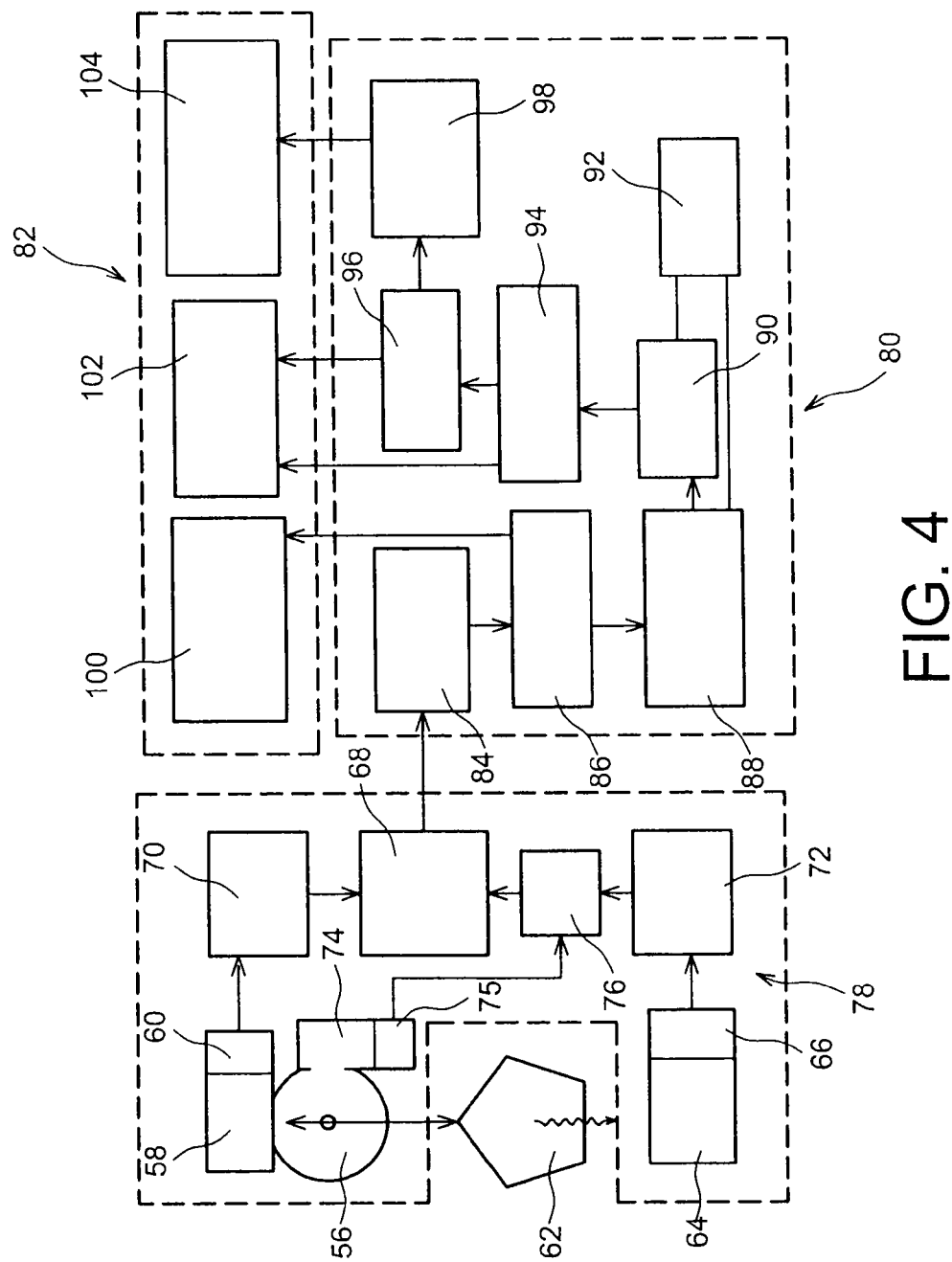
FIG. 4 shows in a more detailed manner the associated particle measurement system which is the subject of the invention.

FIG. 4 illustrates the processing of information for an associated particle neutron interrogation system, or associated particle measurement system, which is in accordance with the invention.

This system physically comprises a neutron tube 56 which is in accordance with the invention (and that may be called the "associated particle tube") equipped with a first alpha detector 58 which is equipped with a device 60 for formatting the signals that it supplies and which is orientated in such a way that the alpha particles associated with the neutrons emitted towards the object 62 to be analysed are detected by this detector 58.

The system also includes gamma detectors 64 which are equipped with a device 66 for formatting the data that they supply. These detectors analyse the gamma radiation emitted by the object 56 and enable this object to be analysed. The signals supplied by these detectors 64 are examined by an electronic coincidence circuit 68 (detection of alpha-gamma coincidences).

It should be stated that the function of the circuit 70 in FIG. 4 (by means of which the device 60 is linked to the circuit 68, as can be seen) is to process the signals received and to issue date values (measurement of the instant at which the alpha particle arrives at the detector) and location (location at which the particle interacts with the detector) values.

Furthermore, the function of circuit 72 in FIG. 4 (by means of which the device 66 is linked to the circuit 76 (described later), as can be seen) is to date a gamma event and to locate it as appropriate (when there are several gamma detectors, only the number of the detector concerned will be used, for example).

If the signals supplied by the gamma detectors 64 are temporally coincident (to the nearest nanosecond), this means that they arise from correlated physical events (detection of an alpha particle whose associated neutron has generated, by colliding with the material in the object 62, a gamma photon which is detected by one of the gamma detectors 64).

The functions of elements with references 74 and 76 in FIG. 4 are functions associated with the electronic shielding.

The element 74 represents the second alpha detector with which the tube 56 is equipped. This is the alpha detector which is related to the electronic shielding function. It is geometrically positioned so that the neutrons emitted by the tube 56 towards the gamma detectors 64 have their associated alpha particles directed towards this alpha detector 74.

The element 76 is a circuit which constitutes a noise killer. It examines a signal issued by device 75 for formatting the signals issued by the gamma detectors.

If this signal is temporally coincident with the alpha detector 74, this means that the signal under consideration is probably due to the neutron whose corresponding alpha particle this alpha detector 74 has detected. Therefore this signal does not come from a gamma photon emitted by the object 62, and is consequently rejected.

In the measurement system shown in FIG. 4, the acquisition of data supplied by alpha detectors 58 and 74 and by gamma detectors 64 is achieved by the system 78 which associates together the elements with references 68, 70, 72 and 76.

In this FIG. 4, there can also be seen a system 80 for processing the data thus acquired. This processing system 80 is equipped with a man-machine interface 82. In FIG. 4 can be seen the various elements which make up this processing system 80 and the connections between these elements.

This processing system 80 includes:
an energy adjustment circuit 84 connected to the circuit 68,
a circuit for reconstruction in three dimensions 86,
a fast spectral unfolding and sorting circuit 88,
a spectral unfolding circuit 90,
a library of elements 92,
an element quantification circuit 94,
a material recognition circuit 96, and
a decision making software 98.

Also in FIG. 4 can be seen the elements which make up the man-machine interface 82 and connections which correspond to them. This interface includes:
means 100 for fast display of object gamma luminance,
means 102 for displaying images in three dimensions (in particular chemical elements and percentages), and
means of decision making 104 (alarms, materials and likelihoods).

In the examples of the invention given above a single additional alpha detector is envisaged. If required, for example if there are a large number of gamma detectors, the sealed neutron tube may, however, be equipped with several additional alpha detectors and the means of data acquisition and data processing which are associated with the neutron tube and with the gamma detectors may consequently be adapted.

The invention claimed is:

1. An associated particle measurement system for analyzing an object using gamma radiation induced by neutrons that interact with the object, the system comprising:
   a sealed tube neutron generator including a target, a first alpha particle detector, for monitoring neutrons that are emitted by the target at a first solid angle defined by the first alpha particle detector and the target, and at least one second alpha particle detector, for monitoring neutrons that are emitted by the target at a second solid angle defined by the second alpha particle detector and the target and that is different from the first solid angle; and
   at least one gamma radiation detector;
   wherein the first alpha particle detector is configured to detect alpha particles associated with neutrons that interact with the object, when the object is placed at the first solid angle, and
   wherein the second alpha particle detector is configured to detect alpha particles associated with neutrons sent towards the radiation detector and that do not interact with the object, and
   further comprising a noise killer circuit to reject a signal based on the alpha particles detected by the second alpha particle detector to reduce noise affecting measurements.

2. The system according to claim 1, wherein the first and second alpha particle detectors are adjacent to each other.

3. The system as claimed in claim 1, wherein the first and second alpha particle detectors respectively form first and second portions of a single alpha particle detector, with the second portion enabling the solid angle associated with the first portion to be extended.

4. The system as claimed in claim 1, wherein the first and second alpha particle detectors are made of materials selected from semiconductors and scintillators.

5. The system according to claim 4, wherein the first and second alpha particle detectors are made from materials selected from YAP, ZnO, LSO, ZnS, and LaBr3.

6. A system according to claim 1, further comprising:
   a system for acquiring data supplied by the first and second alpha particle detectors and by the gamma radiation detector; and
   a system for processing the acquired data.

7. The system according to claim 1, lacking protective shielding against neutrons between the sealed-tube neutron generator and the gamma radiation detector.

* * * * *